T. C. RUSSELL.
TOASTER.
APPLICATION FILED DEC. 1, 1921.

1,425,546.

Patented Aug. 15, 1922.

Witness:
T. J. Sauser.

Inventor:
Thomas C. Russell,
By Charles J. Schmidt, Atty.

UNITED STATES PATENT OFFICE.

THOMAS C. RUSSELL, OF CHICAGO, ILLINOIS.

TOASTER.

1,425,546.   Specification of Letters Patent.   Patented Aug. 15, 1922.

Application filed December 1, 1921. Serial No. 519,077.

*To all whom it may concern:*

Be it known that I, THOMAS C. RUSSELL, a citizen of the United States and a resident of Chicago, in the county of Cook, State of Illinois, have invented certain new and useful Improvements in Toasters, of which the following is a specification.

My invention relates to toasters and covers particularly improved construction and arrangement for automatically reversing the bread slices on the trays which swing them into position in front of the heating element.

Figure 1:
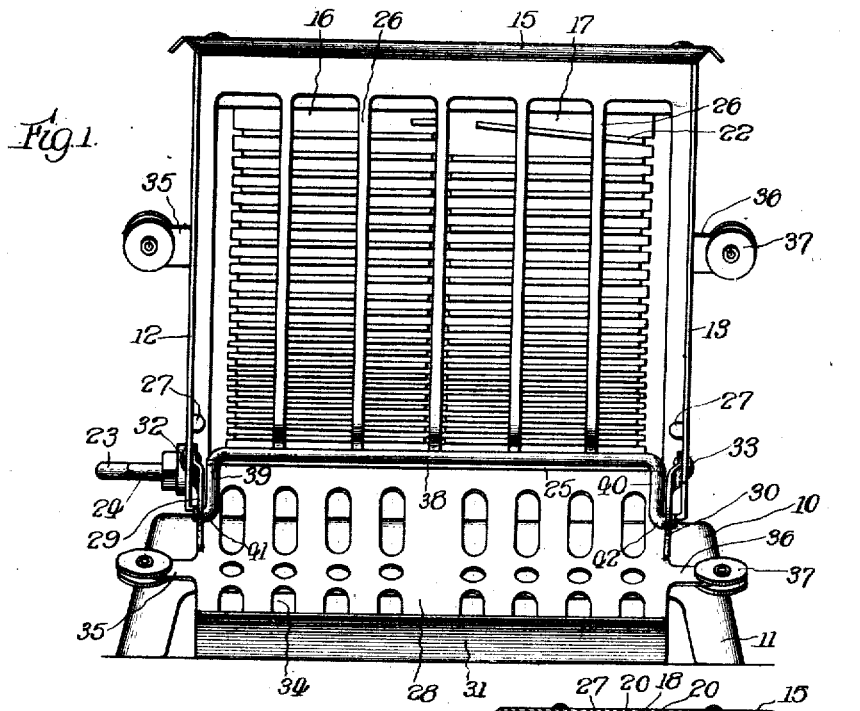
Figure 2:
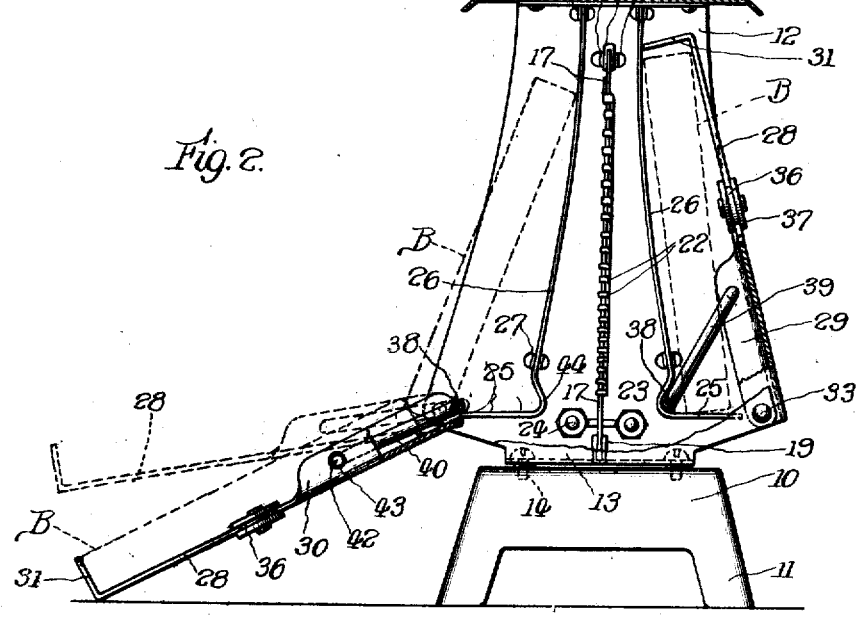

My improved construction and arrangement is incorporated in a toaster shown in the accompanying drawing, in which Fig. 1 is a front elevational view with one of the supporting trays down, and Fig. 2 is a side elevational view with the end wall removed.

The toaster shown comprises a sheet metal base 10 having the legs 11. At the opposite ends of the base are the frusto-conical shaped side walls 12 and 13 secured on the base by means of screws 14, a top 15 being secured to the upper ends of the walls in any suitable manner.

Extending vertically from the base to the top and centrally thereof, is the electrical heating structure shown here as comprising two strips 16 and 17 of mica clamped in the upper and lower bars 18 and 19 secured to the side walls 12 and 13 between ears 20 deflected from said walls. The mica strips have notches along their side edges and are wound with resistance ribbon 22 which engages in and is supported by the notches, the ends of the resistance ribbon being connected with the terminal pins 23 and 24 supported on the wall 12 but insulated therefrom, these pins serving to receive a suitable terminal socket on an extension cord.

On each side of the device in front of the heating element a grill frame is provided for supporting the bread slices while they are being toasted. Each grill frame is preferably stamped from a single piece of sheet metal and comprises a forwardly extending shelf 25 at its lower end, and grill bars 26 extending upwardly from the rear edge of the shelf and in front of the heating element. The bread slice B to be toasted is supported on edge on the shelf 25 and rests against the grill bars 26, which bars preferably incline inwardly toward their tops so that the bread slice may lean against them and hold itself in place. The grill frames can be conveniently secured in place between the end walls by the ears 27 deflected from said walls.

At each side of the toaster is a tray 28 in the form of a rectangular sheet metal frame having side flanges 29 and 30 and a front flange 31. The trays are hinged by means of pins 32 and 33 extending through the rear ends of the side flanges and through the lower corners of the end frames 12 and 13, the hinge connection being such that when a tray is down as shown in full line, Fig. 2, the rear edge thereof is a slight distance below the front edge of the respective shelf 25. The trays are more or less skeletonized by the perforations or slots 34, and laterally extending arms 35 and 36 on each tray have heat insulating buttons or disks 37 secured thereto by means of which the trays may readily be swung.

For each side of the toaster there is provided a discharge member in the form of a bar 38 extending parallel with the respective shelf, and connected with the respective tray to be moved across the shelf when the tray is swung. In the arrangement shown, links 39 and 40 are secured to the ends of the bar and at their outer ends have the laterally extending pivot deflections 41 and 42 for passing through the holes 43 in the side flanges 29 and 30 of the tray, a distance in front of the rear ends of said flanges. As shown, each discharge member may be in the form of a length of wire bent to form the bar 38, links 39 and 40 and pivot ends 41 and 42. When a tray is down the respective discharge bar 38 will rest on the respective shelf 25 at the front edge thereof, and when the tray is swung upwardly the bar will travel transversely across the shelf, and when the tray is fully up the bar will be within the rearward deflections or pockets 44 in the grill bars 26 at the lower ends thereof, the bar being then out of the way of the material which rests on the shelf to be toasted. The arms 35 and 36 serve as stops for engaging with the front edges of the end walls when a tray is fully closed. When in this position, the tray will lean against the slanting front edges of the end walls and will thus hold itself in upper position.

Describing now the operation, one of the trays is swung down as shown in full lines, Fig. 2 and a slice of bread B to be toasted is placed thereon, the slice being held in place by the end flange 31 and the side flanges 29 and 30 on the tray. By means of the handle 37 the tray is now swung upwardly to closed position against the end walls. During such upward swing the bar 38 travels transversely across the respective shelf 25, and when the tray becomes inclined sufficiently the bread slice thereon will slide downwardly on to the shelf, the bar being eventually shifted into the pockets 44 so that the slice may rest and be supported directly on the shelf 25 in front of the grill bars 26. These bars incline rearwardly so that the deposited slice may lean against them to be at the proper distance from the heat producing element, the turns of the resistance ribbon being closer together at the bottom than at the top to compensate for the greater distance of the slice therefrom at the bottom, all as clearly shown. The bread slice may now be toasted on one side, and when sufficiently toasted the tray is swung downwardly. During such downward movement the bar 38 is pulled forwardly over the shelf and against the lower end of the slice, to shift the slice on to the tray at its lower edge, the upper edge of the slice engaging against the grill bars 26. When the tray becomes sufficiently inclined downwardly the slice will slide down thereon at its lower edge and with its upper edge sliding down along the grill bars. The slice will drop against and slide down the tray against its front flange 31 and with its untoasted side up. When the tray is then swung upwardly again, the untoasted side will be brought against the grill bars to be toasted. The discharge member does not support the toast but serves merely to push the lower end of the toast from the supporting shelf on to the inclined tray so that the toast may slide down the tray and be reversed ready to have its untoasted side toasted when the tray is again swung up. Toasting can be thus rapidly and uniformly accomplished without handling it to reverse it.

Having described my invention, I claim the following:

1. In a toaster, the combination of a heat producing element, a shelf in front of said element for supporting material to be toasted, a tray hinged in front of said shelf to support the material and carry it on to the shelf when the tray is swung up, and a discharge member resting on said shelf and connected with said tray to be controlled thereby, said discharge member being at the rear of said shelf behind the lower edge of the material when said material is in toasting position on the shelf, and said member being slid forwardly on said shelf when the tray is swung down to shift the lower end of the material on to the tray so that said material may slide down the shelf and reverse itself.

2. In a toaster, the combination of a heat producing element, a shelf in front of said element for supporting material to be toasted, a tray hinged with its rear edge adjacent the front edge of said shelf, said tray being adapted to be swung downwardly in inclined position and upwardly in front of the heat producing element, said tray receiving and supporting the material to be toasted and depositing it on said shelf when it is swung up, a discharge bar on said shelf connected with said tray to be shifted across said shelf when said tray is raised and lowered, said bar being shifted to the rear of the shelf when the tray is raised to deposit the material on the shelf, and being shifted forwardly on the shelf to push the lower end of the material from the shelf on to the tray when the tray is swung down whereby said material may slide down the tray with its untoasted side up after one side thereof has been toasted.

3. In a toaster, the combination of a heat producing element, a stationary grill frame in front of said element, a stationary shelf at the lower end of said grill frame, a tray hinged with its rear edge adjacent the front edge of said shelf and adapted to be swung downwardly to inclined position or outwardly in front of said grill frame, said tray serving to receive material to be toasted when in its lower position and to swing said material upwardly into position on said shelf and against said grill frame in front of the heat producing element, and a discharge bar resting on said shelf behind the material thereon, said bar being connected with said tray to be shifted forwardly on the shelf when the tray is lowered to thereby engage against the material at the lower end thereof and push such lower end on to the tray whereby said material may then slide down the tray in reversed position.

4. In a toaster, the combination of a vertically extending heating element, a rigid shelf in front of the lower end of said element, stationary grill bars extending upwardly from the rear end of said shelf and in front of said heating element, a tray hinged with its rear edge adjacent the front edge of said shelf, said tray being adapted to be swung down to inclined position to receive material to be toasted and to be swung upwardly to carry the material on to said shelf and against said grill bars, a discharge bar resting on said shelf, links pivoted to said tray and secured to the ends of said bar whereby when said tray is swung said bar will be shifted on said shelf, said bar being behind the lower end of said material when said tray is up and being carried forwardly along the shelf when the tray is swung down to push the lower end of the material on to the tray so that the material may slide down the inclined tray in reversed position.

5. In a toaster, the combination of a supporting frame, a heat producing element within said frame, a stationary shelf secured to said frame at the lower end of said heating element, grill bars extending upwardly from the rear edge of said shelf and in front of said heat producing element, a tray hinged to said frame with its rear edge adjacent the front edge of said frame, said tray being adapted to be swung down to inclined position to receive material to be toasted and to be swung upwardly to deposit the material on to the shelf and against said grill bars, a discharge bar on said shelf having its ends deflected forwardly and connected with said tray whereby swing of said tray will cause the bar to shift transversely on said shelf, said bar being shifted rearwardly on the shelf when the tray is raised to deposit the material on the shelf and being carried forwardly against the lower end of the material when the tray is lowered whereby the lower end of the material will be deposited on the inclined tray and the material will slide down the tray in reversed position.

6. In a toaster, the combination of a supporting frame, a heating element mounted vertically in said frame, a rigid shelf in front of the lower end of said heating element, grill bars extending upwardly from said shelf in front of said heating element, a tray hinged to said frame with its rear edge adjacent the front edge of the shelf, said tray being adapted to be swung downwardly to receive material to be toasted and to be swung upwardly to deposit said material on said shelf and against the grill bars in front of the heating element, and a U-shape discharge member hinged at its ends to said tray and having its yoke part resting on said shelf to be shifted transversely thereon when the tray is raised and lowered, said yoke part being behind the material when it is on the shelf and the tray is up, and said yoke part being pulled forwardly against the lower end of the material when the tray is lowered whereby to shift the lower end of the material on to the inclined tray that it may slide down the tray in reversed position.

7. In a toaster, the combination of a supporting frame, a heating element mounted vertically in said frame, a rigid shelf in front of the lower end of said heating element, grill bars extending upwardly from said shelf in front of said heating element, a tray hinged to said frame with its rear edge adjacent the front edge of the shelf, said tray being adapted to be swung downwardly to receive material to be toasted and to be swung upwardly to deposit said material on said shelf and against the grill bars in front of the heating element, a U-shape discharge member hinged at its ends to said tray and having its yoke part resting on said shelf to be shifted transversely thereon when the tray is raised and lowered, said yoke part being behind the material when it is on the shelf and the tray is up, and said yoke part being pulled forwardly against the lower end of the material when the tray is lowered whereby to shift the lower end of the material on to the inclined tray that it may slide down the tray in reversed position, and pockets in the lower ends of said grill bars for receiving the yoke part of the discharging member where it will be out of the way of the material when the material is on the shelf.

In witness whereof, I hereunto subscribe my name this 29th day of November A. D. 1921.

THOMAS C. RUSSELL.